United States Patent
Cui et al.

(10) Patent No.: US 8,880,711 B2
(45) Date of Patent: Nov. 4, 2014

(54) METHOD AND SYSTEM FOR PROCESSING HTTP REQUESTS WITH MULTIPLE APPLICATION INSTANCES

(75) Inventors: Jie Cui, Beijing (CN); Bin Wang, Beijing (CN); Zhe Xiang, Beijing (CN); Jian Ming Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 902 days.

(21) Appl. No.: 12/868,891

(22) Filed: Aug. 26, 2010

(65) Prior Publication Data

US 2011/0078278 A1    Mar. 31, 2011

(30) Foreign Application Priority Data

Aug. 27, 2009  (CN) .......................... 2009 1 0170952

(51) Int. Cl.
- G06F 15/16        (2006.01)
- G06F 15/173       (2006.01)
- H04L 29/12        (2006.01)
- H04L 29/08        (2006.01)
- G06F 17/30        (2006.01)

(52) U.S. Cl.
CPC .......... *H04L 61/3045* (2013.01); *H04L 61/301* (2013.01); *H04L 67/02* (2013.01); *H04L 69/329* (2013.01); *H04L 67/142* (2013.01); *H04L 61/35* (2013.01); *H04L 61/1511* (2013.01); *H04L 61/15* (2013.01); *H04L 61/00* (2013.01); *G06F 17/30861* (2013.01); *G06F 17/30873* (2013.01); *G06F 17/30887* (2013.01)
USPC ............ 709/228; 709/217; 709/223; 709/245

(58) Field of Classification Search
CPC ... H04L 61/301; H04L 61/3045; H04L 67/02; H04L 69/329; H04L 67/142; H04L 61/35; H04L 61/1511; H04L 61/15; H04L 61/00; G06F 17/30861; G06F 17/30873; G06F 17/30887
USPC .................................. 709/217, 223, 228, 245
See application file for complete search history.

(56) References Cited

U.S. PATENT DOCUMENTS

| | | | | |
|---|---|---|---|---|
| 6,748,420 B1 * | 6/2004 | Quatrano et al. | ............. | 709/205 |
| 6,976,090 B2 * | 12/2005 | Ben-Shaul et al. | ........... | 709/246 |

(Continued)

FOREIGN PATENT DOCUMENTS

| | | |
|---|---|---|
| CN | 1677277 | 10/2005 |
| CN | 1703701 | 11/2005 |

OTHER PUBLICATIONS

Newton, Harry. "Newton's Telecom Dictionary" Feb. 2006, CMP Books, 22 ed. pp. 317 and 953.*

(Continued)

*Primary Examiner* — Daniel C Murray
(74) *Attorney, Agent, or Firm* — F. Chau & Associate, LLC

(57) ABSTRACT

A method and a system for processing an HTTP request. There is provided a method for processing an HTTP request, including: receiving an original HTTP request for accessing an instance of an application; modifying a domain name to be accessed; and sending the new HTTP request to a server of the application so as to access the instance of the application, wherein the domain name to be accessed by the original HTTP request and the new domain name correspond to a same IP address. This avoids various problems such as data confusion, data error, and use inconvenience in the related art occurring when a plurality of service instances of a same application run in a same hypertext transfer protocol session. A system for carrying out the above method is also provided.

22 Claims, 8 Drawing Sheets

(56) References Cited

U.S. PATENT DOCUMENTS

| | | | |
|---|---|---|---|
| 6,983,479 B1* | 1/2006 | Salas et al. .................. 725/23 |
| 7,437,710 B2* | 10/2008 | Bau et al. .................. 717/117 |
| 7,562,153 B2* | 7/2009 | Biliris et al. .................. 709/238 |
| 7,599,920 B1* | 10/2009 | Fox et al. .................. 1/1 |
| 7,792,994 B1* | 9/2010 | Hernacki .................. 709/245 |
| 7,886,032 B1* | 2/2011 | Louz-On .................. 709/223 |
| 8,301,783 B2* | 10/2012 | Behl et al. .................. 709/228 |
| 8,307,076 B1* | 11/2012 | Louz-On .................. 709/224 |
| 8,316,124 B1* | 11/2012 | Baumback et al. .................. 709/224 |
| 8,341,226 B2* | 12/2012 | Li et al. .................. 709/206 |
| 8,347,394 B1* | 1/2013 | Lee .................. 726/25 |
| 8,380,877 B2* | 2/2013 | Haugland et al. .................. 709/245 |
| 8,392,837 B2* | 3/2013 | Li .................. 715/747 |
| 8,527,631 B1* | 9/2013 | Liang .................. 709/225 |
| 2002/0010795 A1* | 1/2002 | Brown .................. 709/245 |
| 2002/0010798 A1* | 1/2002 | Ben-Shaul et al. .................. 709/247 |
| 2002/0078233 A1* | 6/2002 | Biliris et al. .................. 709/238 |
| 2002/0152257 A1* | 10/2002 | Frolik et al. .................. 709/201 |
| 2003/0063122 A1* | 4/2003 | Cichowlas et al. .................. 345/760 |
| 2003/0065739 A1* | 4/2003 | Shnier .................. 709/217 |
| 2003/0135566 A1* | 7/2003 | Nishiguchi et al. .................. 709/206 |
| 2003/0172167 A1* | 9/2003 | Judge et al. .................. 709/229 |
| 2004/0054963 A1* | 3/2004 | Kobayashi et al. .................. 715/500 |
| 2004/0193699 A1* | 9/2004 | Heymann et al. .................. 709/218 |
| 2005/0080927 A1* | 4/2005 | Anderson et al. .................. 709/245 |
| 2006/0155563 A1* | 7/2006 | Banerjee et al. .................. 705/1 |
| 2007/0220125 A1* | 9/2007 | Li et al. .................. 709/223 |
| 2008/0209050 A1 | 8/2008 | Li |
| 2008/0209338 A1* | 8/2008 | Li .................. 715/745 |
| 2008/0295003 A1* | 11/2008 | Behl .................. 715/760 |
| 2011/0289138 A1* | 11/2011 | Turakhia .................. 709/203 |
| 2012/0023091 A1* | 1/2012 | Fox et al. .................. 707/709 |
| 2013/0080575 A1* | 3/2013 | Prince et al. .................. 709/217 |
| 2013/0166704 A1* | 6/2013 | Haugland et al. .................. 709/220 |
| 2013/0346597 A1* | 12/2013 | Baumback et al. .................. 709/224 |

OTHER PUBLICATIONS

English Abstract for Publication No. CN1677277.
English Abstract for Publication No. CN1703701.
Chinese Office Action Dated Dec. 14, 2012.
IEBlog: Session Cookies, sessionStorage, and IE8 or "How can I log into two webmail accounts at the same time?" internet Explorer 8 Readiness Tookit, published website., http://blogs.msdn.com/b/ie/archive/2009/05/06/session-cookiesstorage-andie8.aspx first published: May 6, 2009, updated Jan. 11, 2010, printed Aug. 26, 2010.

* cited by examiner

| Instance | New domain name | Session ID | Last access time | Time period for the new domain name |
|---|---|---|---|---|
| Company A | SZQIES 12.oa.wds.com | CDWDUWE | 2008-01-23 16:05 | 15 Minutes |
| Company B | XEQIES 23.oa.wds.com | CDWDUST | 2008-01-23 16:08 | 23 Minutes |

METHOD AND SYSTEM FOR PROCESSING HTTP REQUESTS WITH MULTIPLE APPLICATION INSTANCES

CROSS REFERENCE TO RELATED APPLICATION

This application claims priority under 35 U.S.C. §119 from Chinese Patent Application No. 200910170952.7 filed Aug. 27, 2009, the entire contents of which are incorporated herein by reference.

BACKGROUND OF THE INVENTION

1. Field of the Invention

The present invention relates to HTTP (Hypertext Transfer Protocol) session technology, and in particular, relates to a method and a system for processing an HTTP request.

2. Description of the Related Art

The HTTP hypertext transfer protocol is a one-way protocol. One-way protocol means that according to the HTTP protocol, a server cannot initiate sending a connection request to a client, but can only passively wait for and respond to an HTTP request issued from the client. Since HTTP itself does not support saving a client's state information at a server, a state management mechanism such as a session mechanism, is introduced to maintain a session state between the server and the client.

Introduction of the session mechanism overcomes some limitations of HTTP and enables a relationship between respective HTTP requests to be maintained at the client and the server. Based on the session mechanism, when the client is first connected to the server, an HTTP session is established at the server and variants related to the session are saved, while an HTTP session id is generated to identify variants of the session. Next, the server will instruct a browser, in an HTTP response, to generate, at the client, a "Cookie" corresponding to the HTTP session id. A Cookie is a small segment of text stored by the server in the client. During the session period, each time an HTTP request is issued to the server through the browser, a session id contained in the Cookie will be included in the HTTP request to be sent to the server, such that the server can identify the session and obtain variants related to the session.

However, in the related art, it generally occurs that in an HTTP session, running a plurality of application instances corresponding to a same application is typically required. Since the domain names for a plurality of application instances of a same application are all identical, in this case, for all HTTP requests requesting accessing different application instances, a server of the application will generate a same session id. The plurality of application instances share a common HTTP session. At this time, problems such as data confusion, data loss, and data error may occur, which seriously affect user experience.

FIG. 1 shows an example of a conventional application environment having a plurality of application instances and likely causing problems. As shown in FIG. 1, in this example, there are two servers, one being a portal server 110, and the other being a SaaS (Software As a Service) settlement server 120.

A user may log on to the portal server 110 through a browser with his own username and password, and then the user enters into a page 100. The page 100 comprises three user interface components, such as inline frame (IFrame) 101, IFrame 102, and IFrame 103. IFrame 101, IFrame 102, and IFrame 103 correspond to a same settlement application, thus their access points (IP addresses) are identical. However, a service instance corresponding to the IFrame 101 is Company A's master data and a service instance corresponding to the IFrame 102 is Company B's master data, while a service instance corresponding to the IFrame 103 is Company C's master data.

In the left bottom corner of FIG. 1, there is an example of Cookie 104 when all of the three IFrames are open. From this example, it may be seen that there are two session ids in the Cookie 104, such as, SESSIONID 105 and SESSIONID 106. The SESSIONID 105 is used in communication with the portal server 110, and meanwhile, variant information 111 corresponding to the SESSIONID 105 is saved in the portal server 110. The SESSIONID 106 is used in communication with the settlement server 120, and meanwhile, variant information 121 corresponding to the SESSIONID 106 is saved in the settlement server 120.

According to the related art though there are three application instances corresponding to the settlement application. In this case, it is SESSIONID 106 that is used in communication with the settlement server 120, because the application server (i.e., settlement server) only assigns one HTTP session id such as SESSIONID 106 to the HTTP requests for accessing the three application instances. Since with the SESSIONID 106, it is impossible to distinguish which application instance is in use, problems always occur, because after operation to Company A's master data, a session variant as stored at the settlement server 120 and is a value related to Company A.

After operation to Company B's master data, a session variant as stored at the settlement server 120 may be a value related to Company B. Thus, after operation to Company B's master data, if an HTTP request for accessing Company A is submitted again to return to view Company A's master data, what is actually viewed at this point might be master data related Company B. This causes great confusion and may even cause data error.

In order to solve this problem, in some applications, there is particularly designed a mechanism which forbids the operation when detecting a requirement for instantiating a plurality of service instances of a same application during a same HTTP session period. In other words, if data of another company is to be processed, the current HTTP session must be terminated to reconnect to the server. This manner, though it avoids data confusion and data error, is quite troublesome, which brings bad experience to users. Thus, this solution cannot satisfy commercial demands at all.

There is another solution which only guarantees that the data of the last accessed service instance is correct. This solution is simple, but users cannot view master data of previous application instances, which still causes great inconvenience to users.

FIG. 1 shows that the settlement server and the portal server are located in an environment of a same domain. These problems still occur when the settlement server and the portal server are located in different domains.

SUMMARY OF THE INVENTION

According to an aspect of the present invention, a method for processing a hypertext transfer protocol HTTP request is presented. The method includes: receiving an original HTTP request for accessing an instance of an application; modifying a domain name to be accessed by the original HTTP request to a new domain name different from a domain name of the application if the domain name to be accessed by the original HTTP request is identical to the domain name of the application, so as to generate a new HTTP request for accessing the instance of the application; and sending the new HTTP request to a server of the application so as to access the instance of the application, wherein the domain name to be accessed by the original HTTP request and the new domain name correspond to a same IP address.

According to another aspect of the present invention, a system for processing a hypertext transfer protocol HTTP request is presented. The system includes: a receiving module, for receiving an original HTTP request for accessing an instance of an application; a modifying module configured to modify a domain name to be accessed by the original HTTP request to a new domain name different from a domain name of the application if the domain name to be accessed by the original HTTP request is identical to the domain name of the application, so as to generate a new HTTP request for accessing the instance of the application; and a sending module configured to send the new HTTP request to a server of the application so as to access the instance of the application, wherein the domain name to be accessed by the original HTTP request and the new domain name correspond to a same IP address.

According to the above method and system of the present invention, various kinds of problems in the related art such as data confusion, data error, and inconvenience in use, which occur when a plurality of service instances of a same application run in a same hypertext transfer protocol session, may be avoided. This not only brings good experience to users, but also satisfies commercial demands.

BRIEF DESCRIPTION OF THE DRAWINGS

The above and other features of the present invention will become more apparent through detailed description of the embodiments as illustrated with reference to the accompanying drawings. In the accompanying drawings of the present invention, like reference signs indicate like or similar components. In the drawings.

DETAILED DESCRIPTION OF THE PREFERRED EMBODIMENTS

The present invention provides a method and a system for processing an HTTP request so as to overcome the problems in the related art.

According to an aspect of the present invention, there is provided a method for processing a hypertext transfer protocol HTTP request, including: receiving an original HTTP request for accessing an instance of an application; modifying a domain name to be accessed by the original HTTP request to a new domain name different from a domain name of the application if the domain name to be accessed by the original HTTP request is identical to the domain name of the application, so as to generate a new HTTP request for accessing the instance of the application; and sending the new HTTP request to a server of the application so as to access the instance of the application, wherein the domain name to be accessed by the original HTTP request and the new domain name correspond to a same IP address.

In an embodiment of the present invention, the method for processing a hypertext transfer protocol HTTP request further includes: directly sending the original HTTP request to the server of the application so as to access the instance of the application if the domain name to be accessed by the original HTTP request is different from the domain name of the application.

According to a further aspect of the present invention, there is provided a system for processing a hypertext transfer protocol HTTP request. The system includes: a receiving module for receiving an original HTTP request for accessing an instance of an application; a modifying module configured to modify a domain name to be accessed by the original HTTP request to a new domain name different from a domain name of the application if the domain name to be accessed by the original HTTP request is identical to the domain name of the application, so as to generate a new HTTP request for accessing the instance of the application; and a sending module configured to send the new HTTP request to a server of the application so as to access the instance of the application, wherein the domain name to be accessed by the original HTTP request and the new domain name correspond to a same IP address.

In an embodiment of the present invention, the sending module is further configured to directly send the original HTTP request to the server of the application so as to access the instance of the application if the domain name to be accessed by the original HTTP request is different from the domain name of the application.

Hereinafter, a method and system for processing an HTTP request according to the present invention will be described in detail through preferred embodiments with reference to the drawings.

Figure 2:
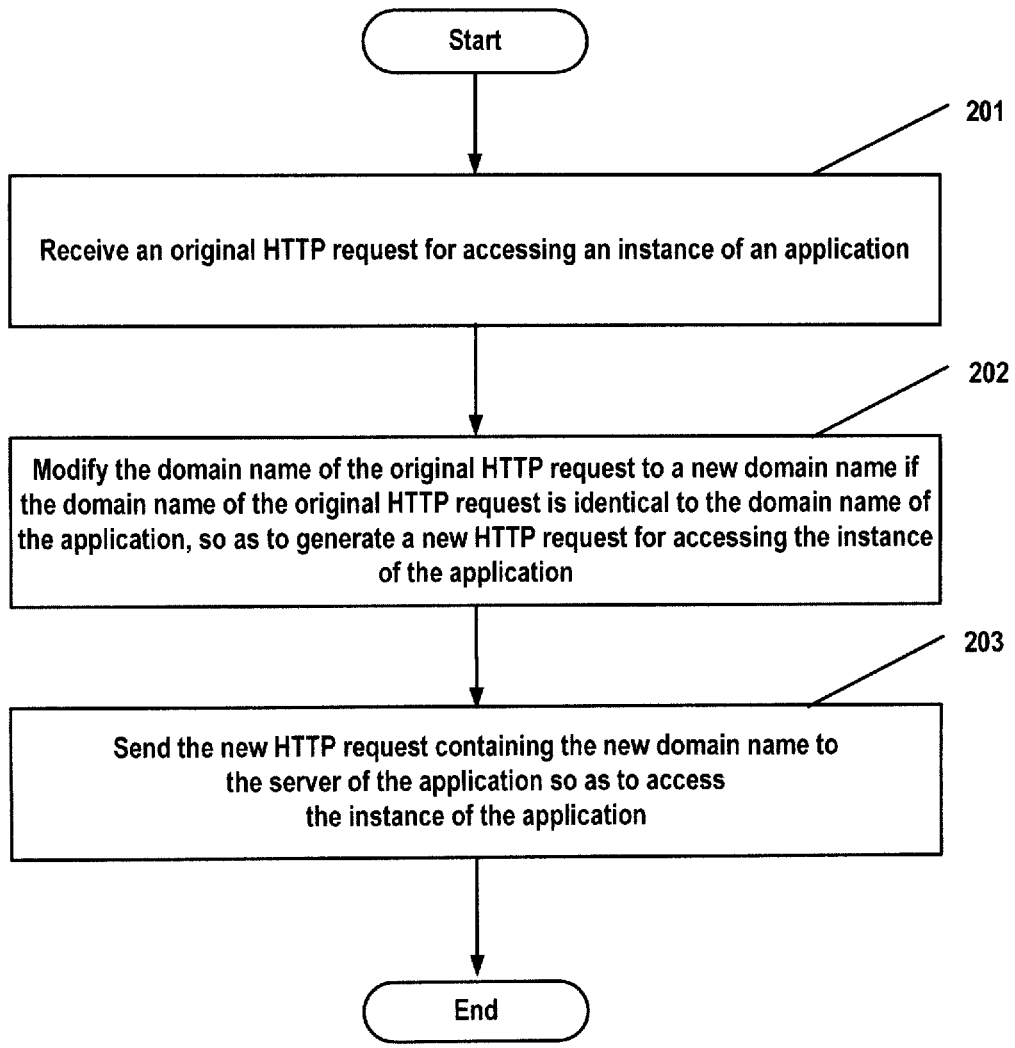
FIG. 2 schematically shows a flow chart of a method for processing an HTTP request according to an embodiment of the present invention.

FIG. 2 shows a flow chart of a method for processing an HTTP request according to an embodiment of the present invention. Referring to FIG. 2, at step 201, an original HTTP request for accessing an instance of an application is received. Such an HTTP request may be issued by a customer using the application from a client browser, and it is called an original HTTP request because this HTTP request is directly issued from the client and received at step 201, without intermediary modification processing.

Figure 1:
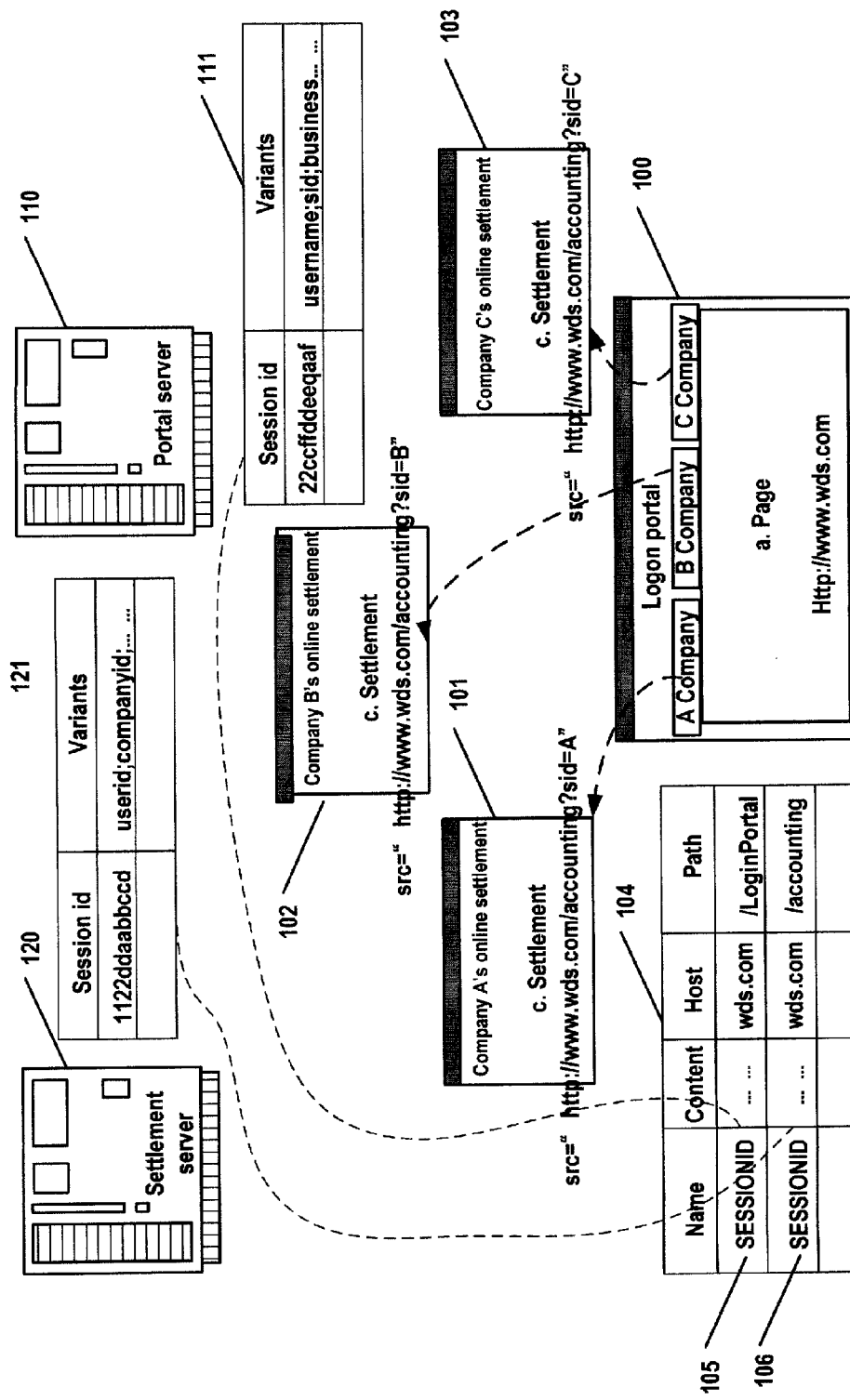
FIG. 1 shows an example of a conventional application environment having a plurality of application instances.

At step 202, the domain name of the received original HTTP request is modified to a new domain name if the domain name to be accessed by the received original HTTP request is identical to a domain name of the application. From the above description on FIG. 1, it is seen that for an application, no matter how many instances it has, the domain names for all instances are identical. In other words, no matter which instance of the application is accessed by the client, the domain name part in the submitted HTTP request should be the domain name of the application. However, at step 202, the modified new domain name is apparently a domain name different from the domain name of the application, and this new domain name must direct to a same IP address as the domain name of the application. If they do not direct to a same IP address, then apparently, the client cannot correctly access the application to be accessed. Thus, after the domain name to be accessed by the original HTTP request is modified to a new domain name, the original HTTP request becomes a new HTTP request for accessing instances of the application.

Those skilled in the art would appreciate that two or more different domain names directed to a same IP address belongs to the "wildcard domain name" technology. For instance, assuming the domain name of a user is abc.com, then the hostname is set as "*", and IP is parsed for example to 218.104.78.100. Those skilled in the art should understand that "*" is a wildcard character, which indicates that all sub-domain names before abc.com will be parsed to 218.104.78.100, thus, for example, input of bbs.abc.com or of 123.abc.com or of 123.234.abc.com will unexceptionally be parsed to 218.104.78.100.

According to a further embodiment of the present invention, the domain name to be accessed by the original HTTP request is modified as a new domain name by adding a randomly generated symbol to the header of the URL address of the received original HTTP request. For example, assuming the URL address of an application is HTTP://oa.wds.com, now the client requests to access an instance "a" of the application for Company A. Then after the user clicks on Company A through a client browser, an original HTTP request HTTP://oa.wds.com/oa?sid=a, which is the URL address to be accessed by the original HTTP request, is instantly issued to a server of the application. Wherein the domain name to be accessed by the original HTTP request is oa.wds.com (the part before "/"), now a randomly generated symbol "aabbcc" is inserted into the header of the domain name, such that the modified new domain name is changed to aabbcc.oa.wds.com. From the above concept of "wildcard domain name," it is seen that both aabbcc.oa.wds.com and oa.wds.com will be parsed to a same IP address.

It should be understood that it is only one manner of modifying a domain name to be accessed by the original HTTP request to a new domain name, and those skilled in the art may adopt various kinds of other manners to modify a domain name to be accessed by the original HTTP request. As long as the modified new domain name and the domain name to be accessed by the original HTTP request are guaranteed to direct to a same IP address, it may implement the objective of the present invention and fall within the protection scope of the present invention.

According to a still further embodiment of the present invention, the above randomly generated symbol should be restrained by a given new domain name pattern. For example, the new domain name pattern is predefined as "aa****", which means the symbol inserted into the header of a domain name comprises 6 bits, wherein the former two are fixed "aa," while the latter 4 are other symbols randomly generated. After predefining such a new domain name pattern, the modification to the domain name to be accessed by the original HTTP request is performed based on the defined new domain name pattern. One purpose for such practice is to compare the pattern of the domain name of the received original HTTP request with the predefined new domain name pattern, thereby determining whether the domain name to be accessed by the original HTTP request is identical to the domain name of the application. The content of this part is described in detail in the literal depiction on FIG. 4B.

It should be further pointed out that in the case of an application including a plurality of application instances, in order to isolate the HTTP sessions for respective application instances, it is necessary to assign a different HTTP session id for an HTTP request accessing a respective application instance. In other words, it is necessary to modify the HTTP request accessing a respective application instance (upon accessing the application instance for the first time) to a new different HTTP request, and only in this way can it be certain that the server of the application assigns a different HTTP session id to the HTTP request accessing respective application instance.

At step 203, the new HTTP request containing the new domain name is sent to the server of the application, so as to access the instance of the application. Those skilled in the art should understand that, since assignment of the HTTP session by the server of the application is performed based on the domain name part in the received HTTP request, i.e., assigning a same HTTP session id to HTTP requests with a same domain name part, while a different HTTP session id is assigned to an HTTP request having a different domain name part, the HTTP request modified through step 202 and containing the new domain name may naturally be assigned an HTTP session id different from the original HTTP request by the server of the application. Accordingly, if such modification is performed to the respective original HTTP request submitted for different application instances of a same application, each original HTTP request may be finally assigned a different HTTP session id by the server of the application, though the domain name parts to be accessed by these original HTTP requests are identical, thereby isolating the HTTP sessions.

Figure 3:
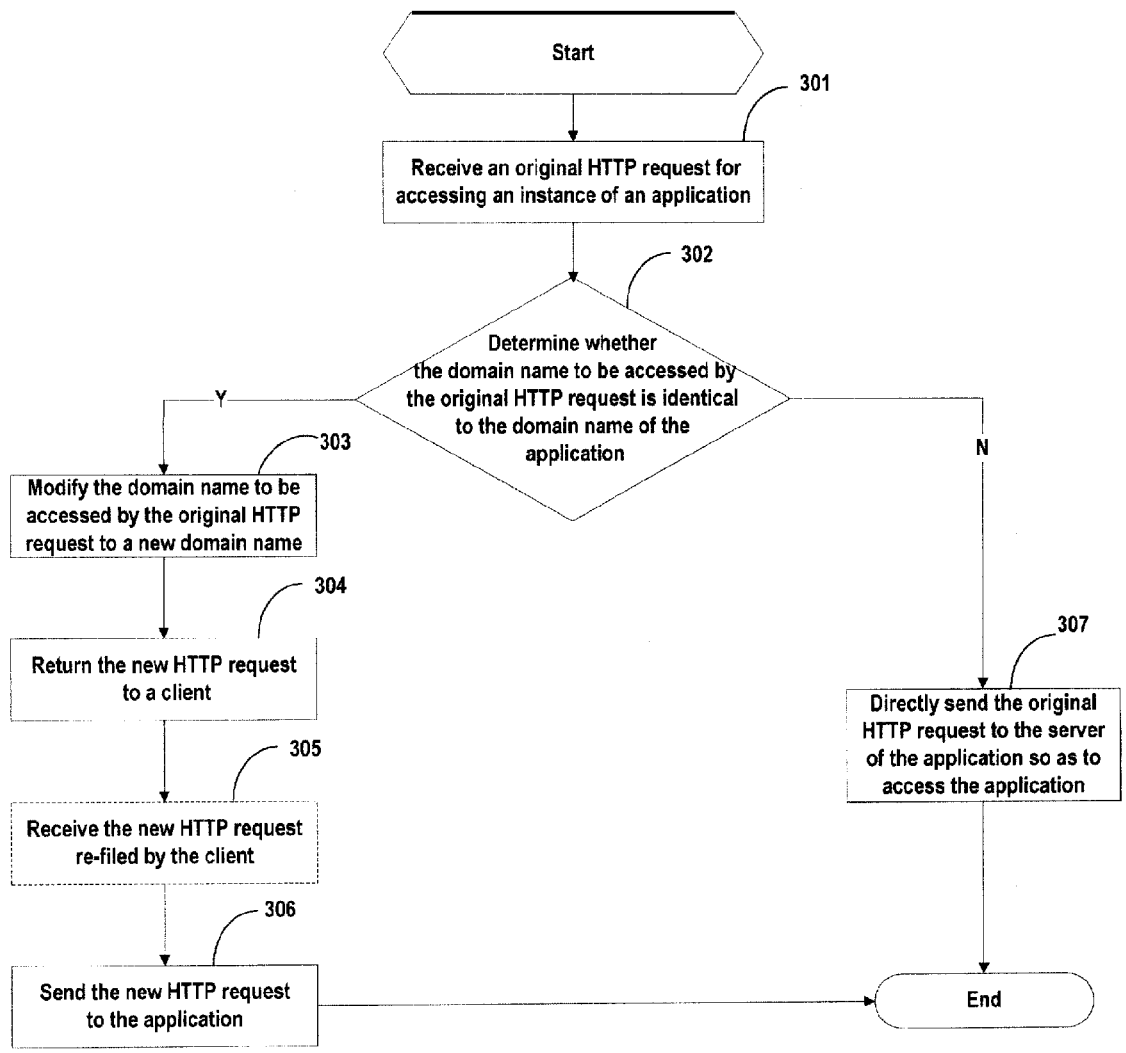
FIG. 3 schematically shows a flow chart of a method for processing an HTTP request according to a further embodiment of the present invention.

FIG. 3 shows a flow chart of a method for processing an HTTP request according to a further embodiment of the present invention. It should be understood that FIG. 3 is a flow chart including a determining step and a client interaction step based on FIG. 2. Specifically, at step 301, as at step 201, an original HTTP request for accessing an instance of an application is received.

At step 302, the received original HTTP request is determined as to whether the domain name part of the request is identical to the domain name of the application. If Yes, step 303 will be performed, and if No, step 307 will be performed.

At step 303, a same operation as at step 202 is performed, where the domain name of the original HTTP request is modified to a new domain name. At step 304, a new HTTP request containing the modified new domain name is returned to the client, such that the client can record the new domain name corresponding to a particular instance of the application. Alternatively, the client may resubmit the new HTTP request containing the modified new domain name. Alternatively, the client only records a new domain name corresponding to a particular instance of the application, but does not resubmit the new HTTP request containing the modified new domain name. It should be noted that here, the URL Redirection technology is used, and the client will automatically submit the new HTTP request, namely the HTTP request containing the redirected URL address, without requiring the user to perform the operation of submitting the HTTP request again at the client. Here, the objective of returning the new HTTP request to the client instead of directly sending it to the application lies in enabling the client to know and record the new HTTP request that is modified from the submitted original HTTP request, such that the user, upon a next request for accessing a same application instance, can directly submit the recorded new HTTP request containing a new domain name. Thereby it is unnecessary to further experience the process of modifying the domain name. In other words, if No is determined at step 302, the step 307 is directly performed to send the original HTTP request to the application. It should be noted that returning the new HTTP request to the client is not a necessary step of the present invention, and those skilled in the art may also select directly sending the new HTTP request to the application. Upon the next time the client submits an HTTP request for accessing the same instance, the domain name of the original HTTP request is re-modified.

At step 305, the new HTTP request which has been recorded and resubmitted by the client is received, and at step 306, the new HTTP request is sent to the application. It should be noted that step 305 is only an embodiment of the present invention. Alternatively, the client may only records a new domain name corresponding to a particular instance of the application, but does not resubmit the new HTTP request containing the modified new domain name.

Figure 4A:
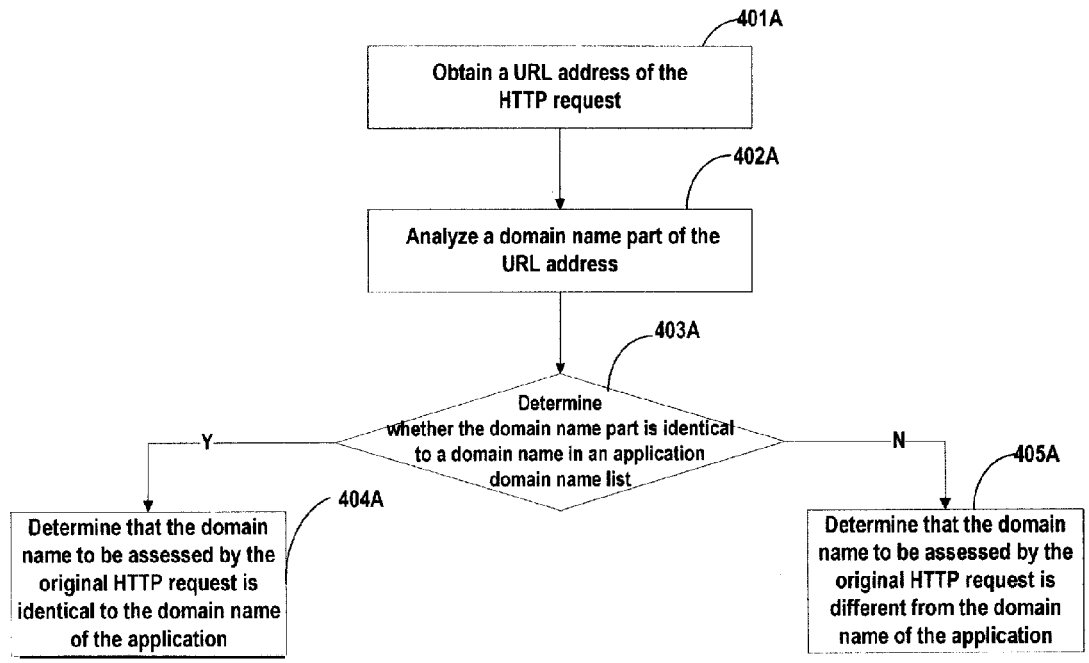
FIG. 4A schematically shows a flow chart of a method for determining a domain name according to an embodiment of the present invention.
Figure 4B:
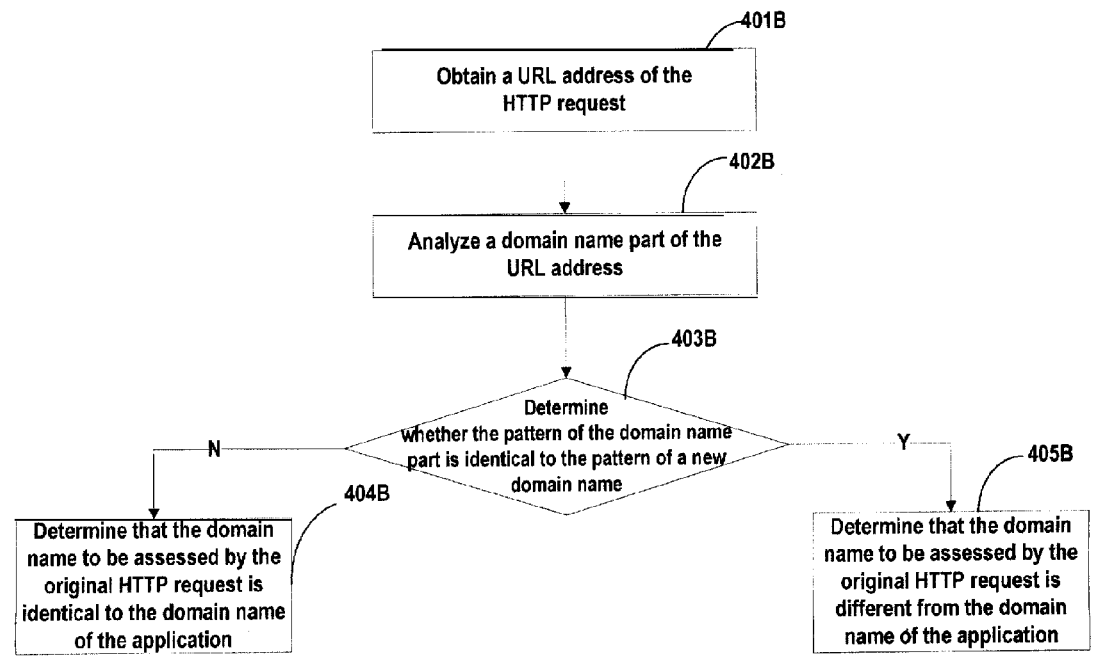
FIG. 4B schematically shows a flow chart of a method for determining a domain name according to a further embodiment of the present invention.

FIGS. 4A and 4B further show two embodiments according to the present invention for determining whether the domain name of the original HTTP request is identical to the domain name of the application with respect to step 302 in FIG. 3. As shown in FIG. 4a, at step 401A, the URL address to be accessed by the HTTP request is obtained. Those skilled in the art should understand, in a complete HTTP request, besides the URL address to be accessed by the HTTP request, there further contains other information such as cookie information. However, at step 401A, it is only required to obtain the URL address to be accessed by the HTTP request, thereby analyzing the domain name part of the obtained URL address at step 402.

At step 403A, whether the domain name part of the obtained URL address is identical to the domain name in an application domain name list is determined, and if Yes, at step 404A, it is determined that the domain name to be accessed by the original HTTP request is identical to the domain name of the application. If No, at step 405A, it is determined that the domain name to be accessed by the original HTTP request is different from the domain name of the application. It should be noted that an application domain name list refers to an existing table recording domain names of all applications. This determining manner is advantageous in the case that the number of applications provided is limited and relatively fixed. Only by one-to-one comparison of the domain name parts of the URL addresses of the HTTP requests with the domain names listed in the application domain name list by searching the table, whether the domain name to be accessed by the original HTTP request is identical to the domain name of the application can be determined.

Hereinafter, a further embodiment for determining whether the domain name of the original HTTP request is identical to the domain name of the application according to the present invention will be described with reference to FIG. 4B. Steps 401B and 402B correspond to steps 401A and 402A, obtaining a URL address of the HTTP request and analyzing a domain name part of the obtained URL address, respectively, which will not be detailed here. Different from the embodiment as illustrated in FIG. 4a, at step 403B, whether a pattern of the domain name part in the obtained URL and a predefined new domain name pattern are identical is determined. If Yes, then at step 404B, it is determined that the domain name to be accessed by the original HTTP request is different from the domain name of the application; and if No, at step 405B, it is determined that the domain name to be accessed by the original HTTP request is identical to the domain name of the application.

Those skilled in the art should understand that when the number of applications as provided is relatively large or varies dynamically, the determining method as shown in FIG. 4B is advantageous. This is because if the number of applications as provided is relatively large or varies dynamically, it would be hard to prerecord real-time the domain names of all applications. By comparing the pattern of the domain name part of the URL of the original HTTP request with the pattern of the predefined new domain name, whether the domain name to be accessed by the original HTTP request is identical to the domain name of the application may be determined. The specific example for the pattern of a new domain name has been described in the literal depiction on FIG. 2, which will not be detailed here.

Figure 5:
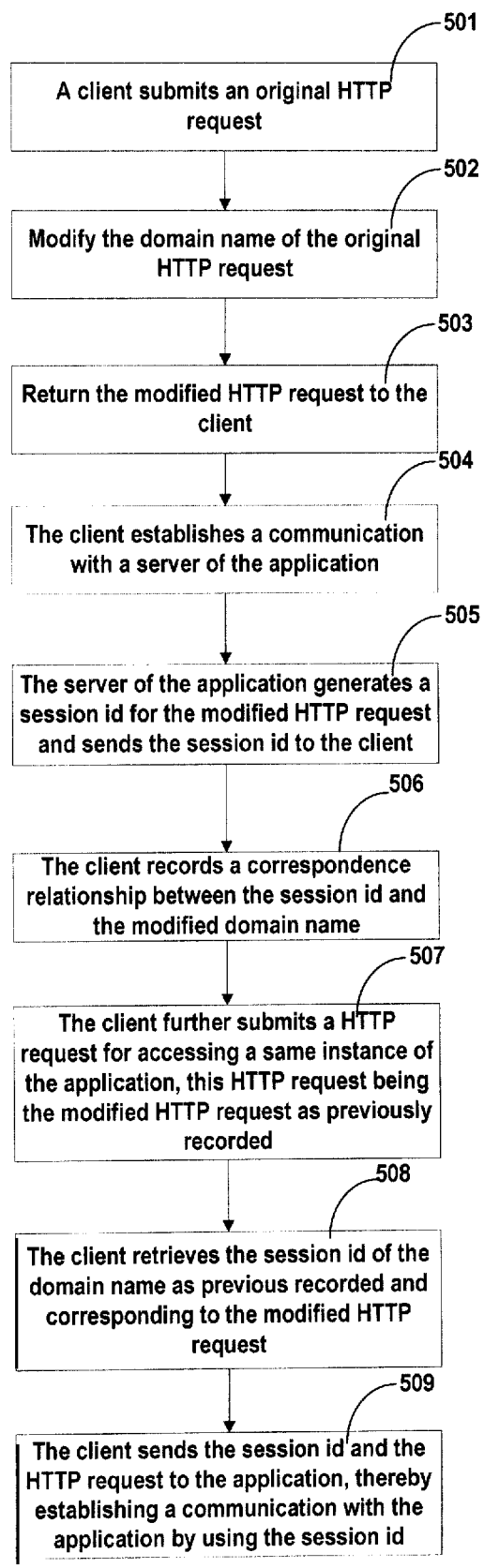
FIG. 5 schematically shows a flow chart of a method for processing an HTTP request submitted by a client according to an embodiment of the present invention.

FIG. 5 shows a flow chart of a method for processing an HTTP request submitted by a client according to an embodiment of the present invention. Steps 501 to steps 504 have been described in detail in the above depictions on FIGS. 2 to 4, and here, the depiction focuses on a process of isolating the HTTP sessions after communication is established between the client and the server.

At step 505, the server of the application generates an HTTP session id for the new HTTP request, and returns the session id to the client issuing the original HTTP request. Those skilled in the art should know that this step is determined by the HTTP protocol specification. For any HTTP request, based on the session mechanism, when the client connects to the server for the first time, the HTTP session is established and variants related to the session are saved at the server; meanwhile, an HTTP SESSIONID is generated to identify the variants of the session.

At step 506, once the server of the application sends the HTTP SESSIONID to the client, the client will record the correspondence relationship between the session ID and the modified domain name. Those skilled in the art should know that, based on the HTTP protocol specification, the client will automatically record the correspondence relationship between the SESSIONID and the domain name at a local cookie. At step 507, if the customer accesses a same application instance again, then the HTTP request as submitted by the client will automatically include the new HTTP request corresponding to the application instance modified and recorded earlier (see step 507) and also include the HTTP session id corresponding to the domain name to be accessed by the new HTTP request (see step 508).

Then, at step 509, the client sends the HTTP session id and the HTTP request together to the application (see steps 302 and 307 of FIG. 3, where if it is detected that the domain name to be accessed by such original HTTP request is different from the domain name of the application, the original HTTP request is directly sent to the application), thereby using the session id to establish a communication with the application. Since for different application instances, their new domain names which have been modified and recorded are different, the session ids assigned by the server of the application are also different, such that when the client requests to access different application instances of a same application, different session ids may be used to establish an HTTP communication with the application.

It should be noted that though the flow chart as shown in FIG. 5 shows steps of the application server generating an HTTP session id and sending the session id to the client, the client recording the correspondence relationship between the session id and the domain name, and the client sending the session id generated earlier and the new domain name recorded earlier to the application when accessing a same instance again, etc (see steps 505 to 509), it does not mean that the above steps are essential steps of the present invention.

Those skilled in the art would appreciate that in a plurality of embodiments of the present invention, different HTTP session ids are obtained just by utilizing the HTTP protocol specification in the related art including generating an HTTP session id and recording the session id in the cookie, and automatically sending the session id when accessing again. Different HTTP session ids are also obtained by modifying the domain name of the original HTTP request in the case that the domain name to be accessed by the original HTTP request accessing an application instance is identical to the domain name of the application, thereby achieving the objective of isolating the HTTP sessions.

In other words, the above steps 505-509 are determined by the HTTP protocol specification in the related art, and the objective of isolating HTTP sessions can only be achieved on the basis of step 503 of modifying the domain name; and the purpose for describing steps 505 to 509 is to describe in detail the whole process of isolating HTTP sessions, which do not constitute a part of technical features in the technical solution as provided by the embodiments of the present invention.

Figures 6, 7:
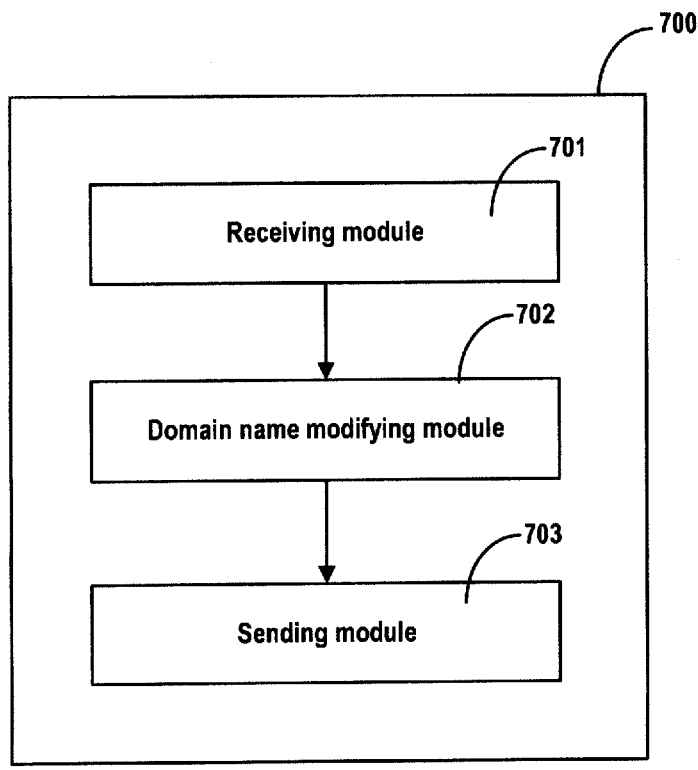
FIG. 6 schematically shows a table recording information related to a new domain name according to an embodiment of the present invention.
FIG. 7 schematically shows a block diagram of a system for processing an HTTP request according to an embodiment of the present invention.

FIG. 6 schematically shows a table recording information related to a new domain name according to an embodiment of the present invention. As described above, the domain name part in the HTTP request submitted by the client when firstly accessing an application instance will be modified to a new domain name to thereby generate a new HTTP request, while next time the client accesses a same application instance, an HTTP request may be issued with the new domain name having been generated and recorded. Communication may be established with the application server by using the session id having been generated by the server of the application and corresponding to the new HTTP request. Then, according to an embodiment of the present invention, a valid period for a new domain name may be limited and recorded, and the last accessing time for accessing an instance is recorded. In other words, the new domain name that has been recorded before limiting is only valid within a certain time period, and beyond this period, even if the client further accesses a same application instance, it cannot establish communication with the application server by using the existing new domain name and the existing HTTP session id. It is also then necessary to re-issue an original HTTP request containing a same domain name part as the domain name of the application, and to further modify it to generate a new HTTP request. This embodiment is helpful to improve security of the network application access system.

As shown in FIG. 6, an application has two application instances, Company A's instance and Company's instance, respectively, where the last time for accessing Company A's instance is 16:05, Jan. 23, 2008, and the time period corresponding to Company A's new domain name is 15 minutes; and the last time for accessing Company B's instance is 16:08, Jan. 23, 2008, and the time period corresponding to Company B's new domain name is 23 minutes. Assuming the current time is 16:30, Jan. 23, 2008 and the client re-submits a request for accessing Company A's instance, then it is detected to have exceeded the 15-minute valid period of the new domain name, so an HTTP request containing the domain name oa.wds.com is submitted and modified. Assuming also at 16:30, Jan. 23, 2008 and the client re-submits a request for accessing Company B's instance, then it is detected to not have exceeded the 23-minute valid period of the new domain name, so an HTTP request containing the domain name XEQIES23.oa.wds.com is submitted and directly sent to the server of the application without modification.

FIG. 7 shows a block diagram of a system for processing an HTTP request according to an embodiment of the present invention. The system is generally indicated as 700 in FIG. 7. Specifically, the system 700 comprises a receiving module 701, a domain name modifying module 702, and a sending module 703. The receiving module 701 is for receiving an original HTTP request for accessing an instance of an application. The domain name modifying module 702 is for modifying the domain name of the original HTTP request to a new domain name in the case that the domain name of the original HTTP request is identical to the domain name of the application, so as to generate a new HTTP request for accessing the instance of the application. By using a wildcard domain name technology, both the new domain name and the domain name of the original HTTP request are directed to a same IP address—the IP address of the application, so as to guarantee correct access of the client to the application. The sending module 703 is for sending the new HTTP request containing the new domain name to the server of the application so as to access the instance of the application. The modules 701-703 as included in the system as shown in FIG. 7 may be interpreted as corresponding to steps 201-203 of the method as shown in FIG. 2. For the embodiments of how to specifically modify a domain name and the content such as pattern limitation of the modified new domain name, please refer to the detailed literal depiction on FIG. 2.

Figure 8:
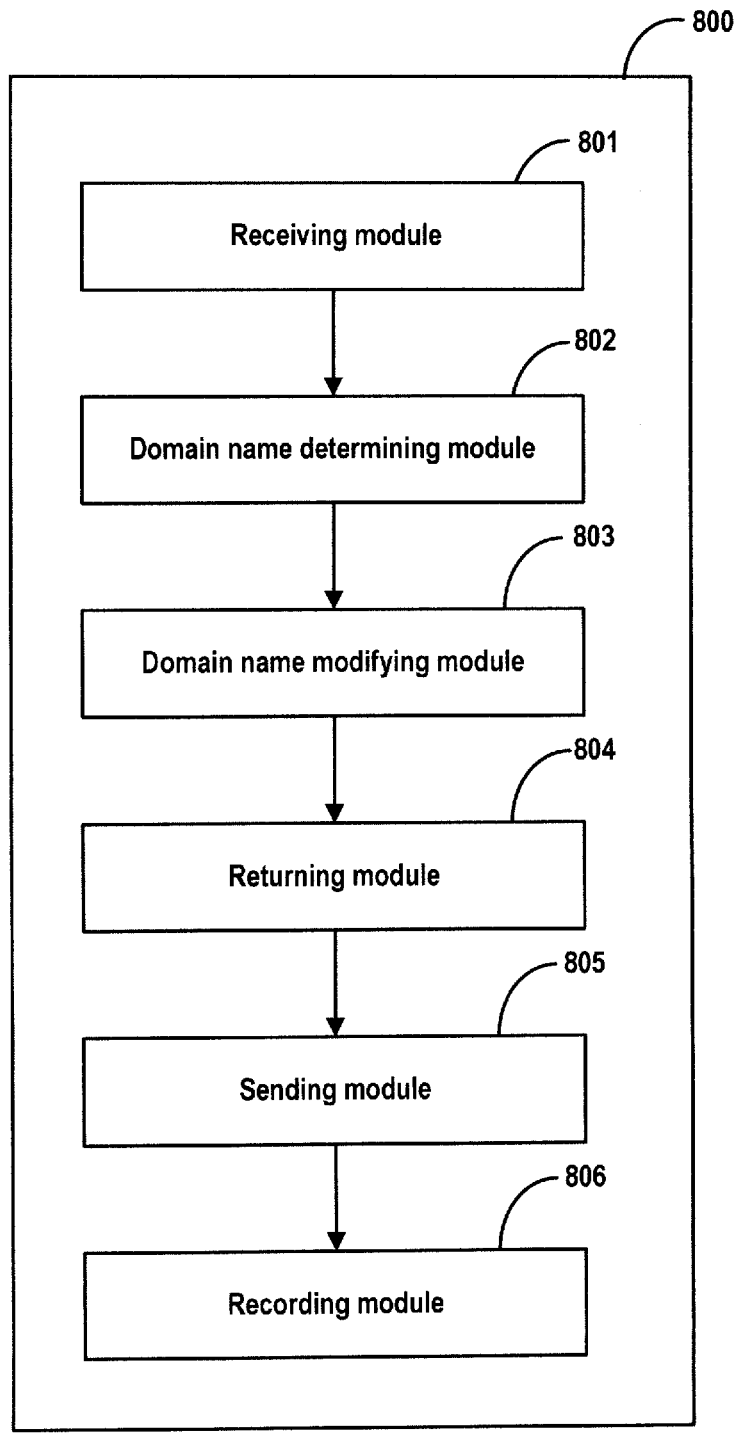
FIG. 8 schematically shows a block diagram of a system for processing an HTTP request according to a further embodiment of the present invention.

FIG. 8 shows a block diagram of a system for processing an HTTP request according to a further embodiment of the present invention. The system shown in FIG. 8 is generally indicated by 800. Specifically, the system 800 comprises a receiving module 801, a domain name determining module 802, a domain name modifying module 803, a returning module 804, a sending module 805, and a recording module 806. The receiving module 801, the domain name modifying module 803 and the sending module 805 correspond to modules 701-703 in the system as shown in FIG. 7, and also correspond to steps 201-203 in the method as shown in FIG. 2. It may be understood that the domain name determining module 802 corresponds to the step 302 as shown in FIG. 3, the module being for determining whether the domain name to be accessed by an original HTTP request for accessing an application instance as received by the receiving module 801 is identical to the domain name of the application. In the case that the determining result as outputted by the domain name determining module is yes, the domain name is modified by the domain name modifying module 803, and the modified new domain name is returned to the client by the returning module 804.

The domain name determining module 802 may determine with the embodiments as shown in FIG. 4a and FIG. 4b; the specific determining method has been described in detail in the literal depiction on FIG. 4. It should be noted that in this embodiment, besides receiving the original HTTP request, the receiving module 801 further receives the new HTTP request resubmitted by the client. The sending module 805 is for sending the new HTTP request to the application, and also for directly sending the original HTTP request to the application in the case that the output of the domain name determining module 802 is "No." The recording module 806 is for recording information such as the last time for accessing the application instance and a valid period of the new domain name corresponding to the application instance; for specific content, please refer to the recording table as shown in FIG. 6.

Figure 9:
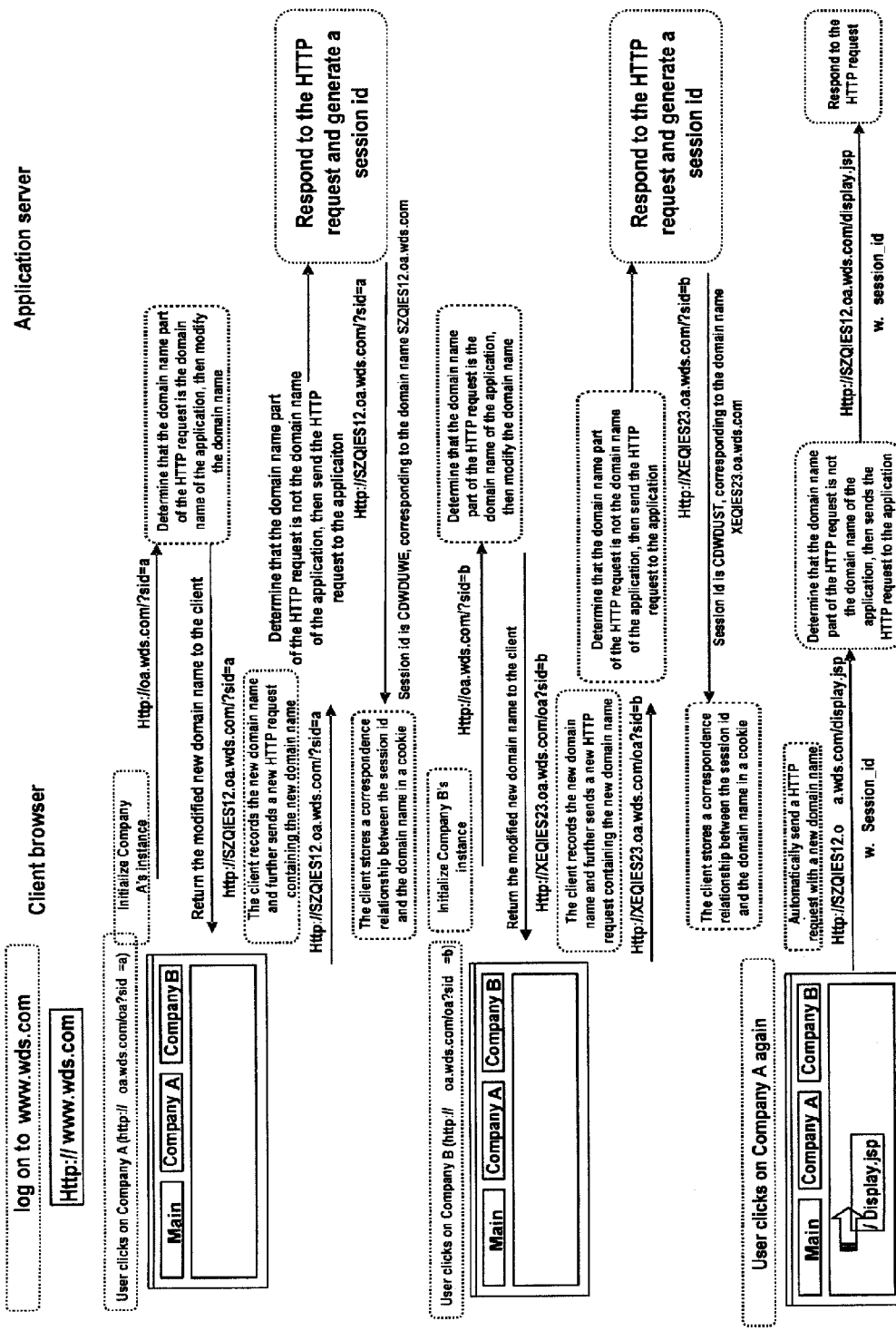
FIG. 9 schematically shows a flow chart of a method for processing an HTTP request submitted by a client according to a further embodiment of the present invention.

FIG. 9 shows a flow chart of a method for processing an HTTP request submitted by a client according to a further embodiment of the present invention. A system for processing an HTTP request according to an embodiment of the present invention may be deployed at an application server side. The system is used to implement the method as shown in FIGS. 2 to 5. Those skilled in the art may understand that the system may also be deployed outside an application server, as long as the system can receive the HTTP request and process it before the HTTP request reaches the application server.

As shown in FIG. 9, a user (for example an accounting firm) logs on to an application portal website www.wds.com, which may provide a plurality of application services, such as accounting services, human resources management services, and IT services. These application services may be Soft-as-a-Service (SaaS). Then, the user clicks on one of a plurality of applications provided in the application portal website, for example, accounting service; the domain name of the accounting service is oa.wds.com; after the user enters into the main page of the accounting service, accounting service is provided to Company A by clicking on the Company A's application instance through a client browser. After the user clicks on "Company A" on the page, an HTTP request is issued, and the URL address to be accessed by the HTTP request is HTTP://oa.wds.com/oa?sid=a.

The system for isolating HTTP sessions receives this HTTP request, analyzes that the domain name to be accessed by the HTTP request is oa.wds.com (the domain name refers to the part after HTTP:// and before "/" in the URL address, determines that the domain name is identical to the domain name of the application of accounting service, and then modifies the domain name as SZQIES12.oa.wds.com and returns the new HTTP request containing the modified domain name to the client browser; and the client automatically records the modified domain name at the local and then re-sends the new HTTP request. After the system for isolating the HTTP sessions receives this new HTTP request, it determines that the domain name part of the HTTP request is not the domain name of the application, and then sends the HTTP request to the server of the application.

It should be noted that the system for isolating HTTP sessions may not only return the new HTTP request containing the modified domain name to the client browser, but may also send the new HTTP request containing the modified domain name to the server of the application, without requiring the client to re-send the new HTTP request. Afterwards, according to the HTTP protocol specification, the application server, in response to the new HTTP request, generates a corresponding HTTP session id CDWDUWE for the domain name SZQIES12.oa.wds.com, and sends the session id with an HTTP response to the client, the session id being recorded in the cookie of Company A's instance by the client browser.

In FIG. 9, it can be seen that after the user clicks on the tag "Company B" in the main page of accounting service application, the application server generates a corresponding HTTP session id CDWDUST for the modified domain name XEQIES23.oa.wds.com, and sends the session id with the HTTP response to the client, the session id being recorded in the cookie of Company B's instance by the client browser.

Next, when the user clicks on the tag "Company A" again, since the client has recorded the modified new domain name SZQIES12.oa.wds.com, an HTTP request will be automatically sent with the new domain name and the corresponding HTTP session id CDWDUWE as previously recorded in the client cookie. The system according to an embodiment of the present invention determines that the domain name part of the HTTP request is not the domain name of the application oa.wds.com, and then directly sends the HTTP request to the accounting service application, and the accounting service application server uses the received session id CDWDUWE to respond to the HTTP request.

Likewise, through it is not shown in FIG. 9, those skilled in the art would further understand that when the user clicks on the tag "Company B" again, the above similar operations are performed.

Additionally, though the present invention has been described with the SaaS application in the above illustrated embodiments, it is only for exemplary purpose, and the present invention is not limited thereto. The application in the present invention may be any appropriate application, for example a generic network application such as an Email application and an online banking application.

Further, though application of the present invention in the case of a browser instance is described in the above illustrated embodiments, it should not be understood as a limitation to the present invention. In fact, the present invention is applicable in an environment requiring running a plurality of service instances in a same HTTP session, not merely in the case of a single browser instance. If a browser is designed such that a plurality of browser instances shares an HTTP session, it is still applicable to the present invention.

Additionally, through the present invention is described in detail with IFrame in the above illustrated embodiments, it is only for illustration purpose. In fact, the present invention is not limited to IFrame. The present invention is also applicable to an environment having any other suitable user interface assembly such as item card.

According to an embodiment of the present invention, by modifying the domain name part of an HTTP request accessing different instances of a same application to a new domain name, isolation of HTTP sessions in the related art is implemented, thereby obtaining sub-sessions corresponding to respective service instances. During communication with the server, respective service instance uses a corresponding HTTP sub-session, such that the server can identify respective service instance through respective HTTP session id, thereby further guaranteeing correctness of data and avoiding confusion caused in the related art. Further, it is transparent to the user, thereby bringing good user experience and better satisfying commercial demands.

Through the above description on preferred embodiments, those skilled in the art may understand that the above system, device and method may be implemented with a computer-executable instruction and/or in a processor control code, for example, such code is provided on a bearer medium such as a magnetic disk, CD, or DVD-ROM, or a programmable memory such as a read-only memory (firmware) or a data bearer such as an optical or electronic signal bearer. The device, server and their components in the present embodiment may be implemented by hardware circuitry of a programmable hardware device such as a very large scale integrated circuit or gate array, a semiconductor such as logical chip or transistor, hardware circuitry of a programmable hardware device such as a field-programmable gate array or a programmable logical device. The device, server and their components in the present embodiment may also be implemented by software executed by various kinds of processors, or implemented by combination of the above hardware circuitry and software.

Though the system and method for processing a local document with remote application has been described in detail with reference to preferred embodiments, the present invention is not limited to this. A person of ordinary skill in the art can make various changes, alterations and modifications to the present invention under the teaching of the description without departing from the spirit and scope of the present invention. It should be understood that all such changes, alterations, and modifications still fall into the protection scope of the present invention. The protection scope of the present invention is defined by the appending claims.

We claim:

1. A method for processing a hypertext transfer protocol HTTP request, the method comprising the steps of:
   receiving an original HTTP request for accessing an instance of an application at a first URL (Universal Resource Locator) including a domain name part;
   changing the first URL to a second URL by modifying the domain name part of the first URL to a new domain name different from the domain name part of the first URL by adding one or more randomly generated characters followed by a period to a header of the first URL when the domain name part of the first URL is identical to a domain name of the application, so as to generate a new HTTP request for accessing the instance of the application at a second URL including the new domain name part; and
   sending the new HTTP request to a server of the application so as to access the instance of the application,
   wherein the first URL and the second URL correspond to a same IP address because the second URL acts as a wildcard domain for the first URL.

2. The method according to claim 1, further comprising: directly sending the original HTTP request to the server of the application so as to access the instance of the application when the domain name part of the first URL is different from the domain name of the application.

3. The method according to claim 1, further comprising: returning the new HTTP request to a client issuing the original HTTP request.

4. The method according to claim 1, further comprising: obtaining a URL of the original HTTP request, and analyzing the domain name part of the obtained URL so as to determine that the domain name part of the first URL is identical to the domain name of the application.

5. The method according to claim 4, wherein when the domain name part of the obtained URL is identical to a domain name in a predefined application domain name list, it is determined that the domain name part of the first URL is identical to the domain name of the application.

6. The method according to claim 4, wherein when a pattern of the domain name part of the obtained URL is different from a predetermined new domain name pattern, it is determined that the domain name part of the first URL is identical to the domain name of the application.

7. The method according to claim 1 wherein the one or more randomly generated characters satisfy a predetermined new domain name pattern.

8. The method according to claim 1, further comprising the steps of:
   recording the new domain name;
   recording the last time for accessing the application according to the new domain name; and
   recording the time period for setting the new domain name as an invalid domain name.

9. The method according to claim 8, further comprising:
   determining whether to maintain the currently received new domain name valid based on the recorded last access time and the recorded time period, where when a determining result is no, the currently received new domain name is regarded as an original domain name identical to the domain name of the application.

10. The method according to claim 1, wherein for different original HTTP requests for accessing different instances of a same application, new domain names obtained by modification are different from each other, and the domain names to be accessed by different original HTTP requests are identical to the domain name of the same application.

11. The method according to claim 1, wherein the application is a software-as-a-service application.

12. A computer program product for processing a hypertext transfer protocol HTTP request, the computer program product comprising a hardware computer readable storage medium having program code embodied therewith, the program code readable/executable by a computer to perform a method comprising:
   receiving an original HTTP request for accessing an instance of an application at a first URL (Universal Resource Locator) including a domain name part;
   changing the first URL to a second URL by modifying the domain name part of the first URL to a new domain name different from the domain name part of the first URL by adding one or more randomly generated characters followed by a period to a header of the first URL when the domain name part of the first URL is identical to a domain name of the application, so as to generate a new HTTP request for accessing the instance of the application at a second URL including the new domain name part; and
   sending the new HTTP request to a server of the application so as to access the instance of the application,
   wherein the first URL and the second URL correspond to a same IP address because the second URL acts as a wildcard domain for the first URL.

13. The computer program product according to claim 12, wherein the original HTTP request is directly sent to the server of the application so as to access the instance of the application when the domain name part of the first URL is different from the domain name of the application.

14. The computer program product according to claim 12, wherein the new HTTP request is returned to a client issuing the original HTTP request.

15. The computer program product according to claim 12, wherein a URL of the original HTTP request is obtained and the domain name part of the obtained URL is analyzed so as to determine whether the domain name part of the first URL is identical to the domain name of the application.

16. The computer program product according to claim 15, wherein it is determined that the domain name part of the first URL is identical to the domain name of the application when the domain name part of the obtained URL is identical to a domain name in a predefined application domain name list.

17. The computer program product according to claim 15, wherein it is determined that the domain name part of the first URL is identical to the domain name of the application when a pattern of the domain name part of the obtained URL is different from a predetermined new domain name pattern.

18. The computer program product according to claim 12, wherein the randomly generated characters satisfy a predetermined new domain name pattern.

19. The computer program product according to claim 12, wherein the new domain name, the last time for accessing the application according to the new domain name, and the time period for setting the new domain name as an invalid domain name are recorded.

20. The computer program product according to claim 19, wherein it is determined whether to maintain the currently received new domain name as valid based on the recorded last access time and the recorded time period, and when a determining result is no, the currently received new domain name is regarded as an original domain name identical to the domain name of the application.

21. The computer program product according to claim 12, wherein for different original HTTP requests for accessing different instances of a same application, new domain names obtained by modification are different from each other, wherein the domain names to be accessed by different original HTTP requests are identical to the domain name of the same application.

22. A computer program product according to claim 12, wherein the application is a software-as-a-service application.

* * * * *